United States Patent [19]

Cross, Jr.

[11] Patent Number: 4,495,066
[45] Date of Patent: Jan. 22, 1985

[54] CARD RETAINER AND CONTROL MEANS FOR INFORMATION RETRIEVAL DEVICES

[75] Inventor: Laurence A. Cross, Jr., Groveville, N.J.

[73] Assignee: Microsize, Inc., Salt Lake City, Utah

[21] Appl. No.: 382,862

[22] Filed: May 28, 1982

Related U.S. Application Data

[63] Continuation-in-part of Ser. No. 291,593, Aug. 10, 1981, Pat. No. 4,421,237.

[51] Int. Cl.³ .............................................. B07C 5/36
[52] U.S. Cl. ..................................... 209/608; 209/610
[58] Field of Search ................. 209/608, 610, 611–613, 209/547, 554; 235/445

[56] References Cited

U.S. PATENT DOCUMENTS

| | | | |
|---|---|---|---|
| 2,395,924 | 3/1946 | Wade | 209/610 |
| 2,495,490 | 1/1950 | Whitson | 209/609 |
| 2,665,694 | 1/1954 | Mooers et al. | 209/608 |
| 3,266,497 | 8/1966 | Bleiman | 209/608 |
| 3,292,631 | 12/1966 | Cross, Jr. | 209/610 |
| 3,486,617 | 12/1969 | Cross, Jr. | 209/610 |
| 3,618,763 | 11/1971 | Cross, Jr. | 209/608 |
| 3,625,359 | 12/1972 | Cross, Jr. | 209/608 |
| 3,690,457 | 9/1972 | Lanahan et al. | 209/608 |
| 4,190,164 | 2/1980 | Matsuda | 209/610 |

FOREIGN PATENT DOCUMENTS 2252738  10/1972  Fed. Rep. of Germany ...... 209/608
829953  3/1937  France Primary Examiner—Robert B. Reeves
Assistant Examiner—Donald T. Hajec
Attorney, Agent, or Firm—Sperry, Zoda & Kane

[57] ABSTRACT

A retainer element is adapted to prevent randomly filed cards, microfiche, microfiche jackets, or microfilm jackets, from accidental fall from capsules in which they are stored. The retainer element automatically moves to a card-protecting position responsive to removal of the capsule from an information retrieval device, so that cards cannot become lost or misplaced at any time when a capsule is not within the information retrieval device. The retainer element is automatically moved, however, to a card-freeing position responsive to insertion of the capsule in the retrieval device. With the capsule in the retrieval device, a control finger is moved to a position overlying the corners of the cards, microfiche, microfiche jackets, or microfilm jackets, at a particular stage of the selection cycle, and becomes a fulcrum about which selected cards pivot to positions in which the selected cards are engaged in an internal notch of the associated capsule, to facilitate their removal.

5 Claims, 9 Drawing Figures

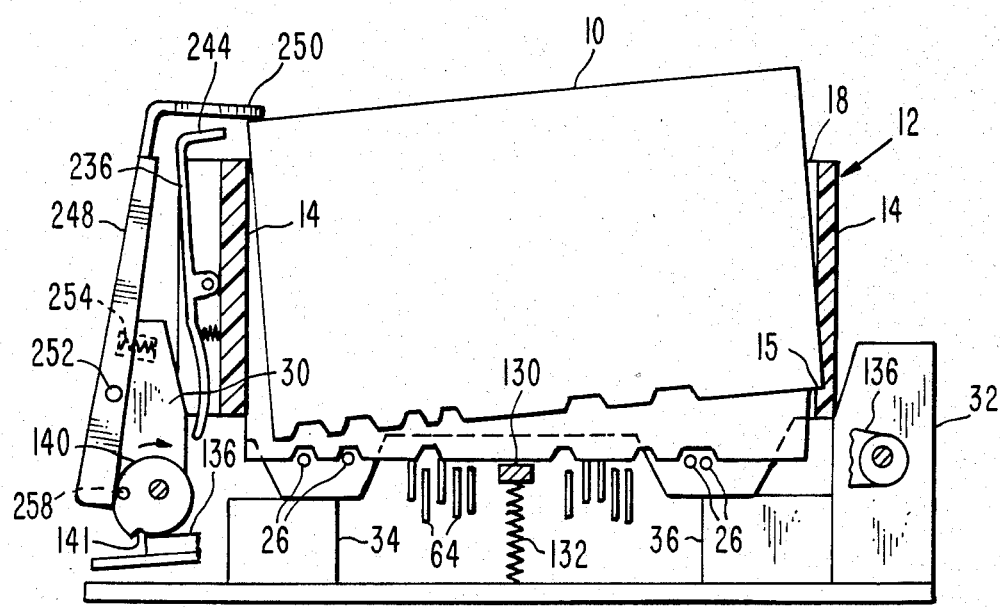
_Fig_7_
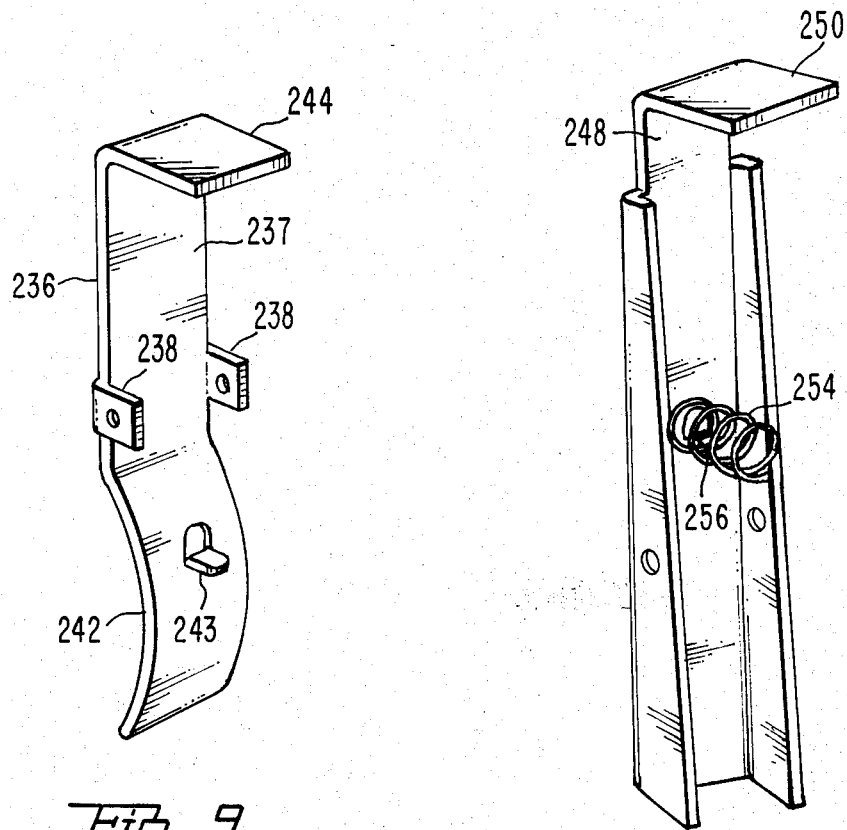
_Fig_9_
_Fig_8_

CARD RETAINER AND CONTROL MEANS FOR INFORMATION RETRIEVAL DEVICES

CROSS-REFERENCE TO RELATED APPLICATIONS

The present application is a continuation-in-part of application Ser. No. 291,593 filed Aug. 10, 1981, now U.S. Pat No. 4,421,237 issued Dec. 20, 1983.

BACKGROUND OF THE INVENTION

1. Field of the Invention

In the field of selecting and retrieving randomly filed cards, microfiche, microfiche jackets, or microfilm jackets, the present invention relates to, first, safeguarding the cards from being accidentally dropped from capsules in which they are stored, so that in one sense, the present invention has regard to capsule construction for information retrieval devices of the type in which cards are normally randomly filed, and are accessed responsive to insertion of the capsule in an associated piece of equipment followed by operation of a selecting means incorporated in the equipment.

The invention pertains, further, to the selection cycle itself, in the sense that the present invention comprises an improvement on the basic invention covered my U.S. Pat. No. 4,421,237 referred to above. The present invention pertains, thus, to the provision of improved means within the information retrieval device itself, adapted to cooperate with the capsule and with the card ejector means in such a way as to cause selected cards to be rocked sharply about a fulcrum and ultimately come to rest in a tilted position in which they are visibly and substantially displaced from unselected cards.

2. Description of the Prior Art

It has been known, heretofore, to provide information retrieval devices for selecting particular cards, microfiche, microfiche jackets, or microfilm jackets, or similar elements that have filed at random in capsules. It has been further known to pre-select capsules from others kept in a storage area, for insertion of the selected capsule in the information retrieval device, following which the retrieval device itself is operated to select and displace a particular card or cards from the inserted capsule.

In my U.S. Pat. No. 4,421,237, I disclose a retrieval device of improved construction, falling within this general, broad description or category. The retrieval device disclosed in said patent includes a bank of selector slides adapted to be received in complementary notches provided in the edges of the cards, and discloses means such that after the desired selector slides have been displaced to enter the notches of the wanted cards, a snap action ejector plate is actuated to displace the wanted cards upwardly in respect to those that have not been selected, to facilitate their removal.

The prior art has disclosed many devices for displacing wanted cards, microfiche, microfiche jackets, or microfilm jackets in respect to those that have not been selected, and the discussion of said prior art found in the mentioned patent, and in the prior art statement filed in the above-mentioned co-pending application maturing into the patent, are hereby incorporated in the present application by reference.

For the purposes of the present application, it is sufficient to note that so far as is known, those information retrieval devices that utilize capsules bodily insertable in the equipment, do not incorporate directly in the capsules card retainer means that will serve efficiently to prevent any card from being accidentally displaced from the capsule when the capsule is out of the information retrieval device itself, but which will automatically move to a card-accessing position responsive to insertion of the capsule in the information retrieval device.

Further, while it is known in the prior art to physically displace wanted from unwanted cards by causing them to be pivoted or rocked about fulcrum points (see U.S. Pat. No. 3,266,497 to Bleiman; my U.S. Pat. Nos. 3,486,617 and 3,292,631; and French Pat. No. 829,953), so far as is known it has not been previously contemplated to incorporate the displacing means part within the capsule itself, and part within the information retrieval device. Nor does the prior art suggest combining the fulcrum means of the information retrieval device with other components of the equipment in such a way as to cause the fulcrum means to move to its operative position immediately prior to operation of the card ejector plate, and remain in said position until after the ejector plate has acted to forcibly eject wanted cards, with both the ejector plate and the fulcrum means being controlled from a single cam in such a way as to establish a particular, desired, timed relationship of the motions of the fulcrum means and the ejector plate, respectively.

SUMMARY OF THE INVENTION

The entire disclosure of my above-mentioned U.S. Pat. No. 4,421,237 is hereby incorporated in the present application by reference. That patent discloses information retrieval equipment of the type in which a selected capsule, containing a quantity of randomly filed cards, microfiche, microfiche jackets, or microfilm jackets, or other information-bearing elements, utilizes a series of selector slides adapted to enter code notches formed in the bottom edges of the cards.

The present invention adds to the disclosure of U.S. Pat. No. 4,421,237, through the provision of a card retainer element which is provided upon each of the capsules. Said element is spring biased, whenever the capsule is not disposed in association with a card selection mechanism, to protectively overlie the cards stored therein. To this end, the retainer means is spring-biased to a card-overlying position whenever the capsule is free of the equipment, that is, the retainer means automatically moves to a card-protecting position responsive to removal of the capsule from the card selector, and will remain in protective relationship to the cards thereafter, unless manually moved to a card-clearing position to permit the intentional insertion or withdrawal of cards. When, however, the capsule is selected for insertion in the retrieval device, the card-retainer means is automatically biased by said device to an out-of-the-way position, to permit displacement of wanted cards.

A second improvement incorporated in the retrieval apparatus disclosed in my co-pending application, has to do with the displacement of wanted cards at the completion of the selection cycle. In my U.S. Pat. No. 4,421,237, an ejector plate is snapped upwardly against selected cards, to force them above unselected cards, after which a bail engages under the upwardly displaced, wanted cards to prevent them from settling back into the pack of those that have not been selected.

While this ejection means is fully operable and is entirely satisfactory with many types of cards, it is desirable to provide an alternative means for displacing wanted cards and holding the same in displaced condition until such time as the user removes them physically from the capsule. Such alternative means may be especially suitable according to the weight and/or the slickness of the cards, and an added factor may be the looseness of the cards within the capsule, a situation which may occur when the capsule is only partially filled.

To this end, it is proposed to provide a spring biased fulcrum member in the equipment, which will cooperate with an internal notch or recess of the capsule, in such a way that the fulcrum member will move to an operative position before the ejection of the card or cards that have been selected, and will remain in this position until the cards have been physically ejected or displaced, and wherein the cards will engage and pivot about the fulcrum member, to positions in which they will automatically settle down into the internal notch or recess of the capsule, being now well displaced from the unwanted cards and securely retained in their displaced positions.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIGS. 4–7 are transverse sectional views through the equipment and the fully inserted capsule, at successively following stages of the selection process;

FIG. 8 is an enlarged perspective view of the fulcrum member per se; and

FIG. 9 is an enlarged perspective view of the card-retaining member per se.

DETAILED DESCRIPTION OF THE PREFERRED EMBODIMENT

Since my U.S. Pat. No. 4,421,237 discloses in full detail the mechanism and means for selecting cards from an inserted capsule, and since the disclosure of that patent has been incorporated herein in its entirety, by reference, it is not believed necessary to repeat said disclosure except to the extent necessary to obtain an understanding of the present improvements.

As used herein, the terms "card," "cards", or "information-bearing elements" include any member that is to be stored in and is retrievable from a capsule, that is, not only "cards" in the ordinary sense, but also such objects as microfiche, microfiche jackets, or microfilm jackets, to name a few examples.

Figure 2:
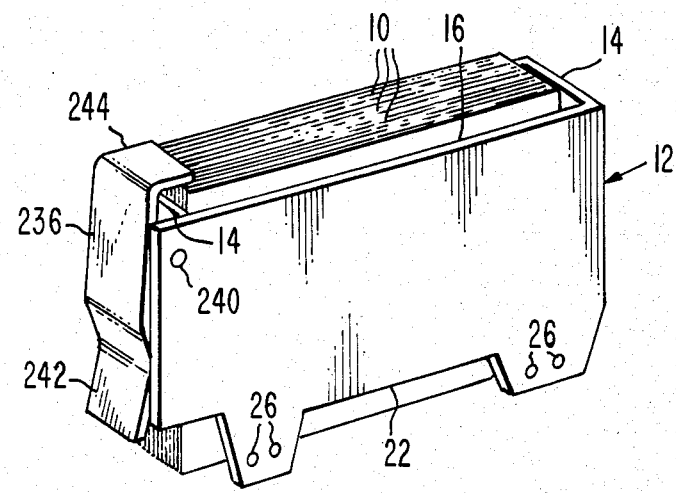
FIG. 2 is an enlarged perspective view of one of the capsules, per se.

Thus, it is sufficient to note that a plurality of cards or similar information-bearing elements 10 are randomly stored within an associated capsule 12 (see FIG. 2) having end walls 14 one of which (see FIG. 7) has an internal, angular recess or notch 15 (see FIG. 7) extending across the full width of the capsule between the opposite face plates 16, 18 thereof. The capsule is formed open at its bottom, and the face plates are formed with deep indentations 22 and with openings receiving the card support bars 26, all as shown in the U.S. Pat. No. 4,421,237.

Up to this point, the capsules are disclosed as identical to those illustrated and described in the mentioned U.S. Pat. No. 4,421,237, except for the provision of notches 15 in one of the end walls 14.

The capsule herein illustrated and described also differs from the capsule of the U.S. Pat. No. 4,421,237, in that the face plates 16, 18 (see FIG. 3) project slightly beyond the end wall 14 opposite that in which notch 15 is formed. Mounted on the capsule in the space between the projecting portions of the face plates, is a card retainer arm 236 not disclosed in the U.S. Pat. No. 4,421,237, and illustrated per se in FIG. 9. Arm 236 is formed from a length of rigid metal material in a preferred embodiment, having a flat, straight upper portion 237 from opposite sides of which extend ears or tabs 238 having transversely aligned openings receiving a pivot pin 240 extending between and carried by face plates 16, 18.

Below the ears 238, arm 236 is formed with a curved lower end portion 242 having a convex surface facing toward the adjacent end wall 14. Provided upon end portion 242 is a spring seat 243 which can be formed in any suitable manner, as for example as a tongue lanced out of the material of the arm. This locates a compression coil spring 246 (see FIG. 3), the other end of which bears against the adjacent end plate 14. Spring 246, being under compression, normally urges the arm 236 to a card-retaining position shown in FIG. 2, in which a forwardly projecting retaining lip 244 of the arm extends over the adjacent upper corners of all the cards 10 disposed within the capsule. Whenever the capsule is out of the retrieval equipment, spring 246 expands to so locate lip 244. As a result, if the capsule is accidentally inverted, none of the cards will fall out. This is important, because as disclosed in the U.S. Pat. No. 4,421,237, cards are basically coded for retention in particular capsules.

It is possible, however, to manually pivot arm 236, against the restraint of spring 246, to a position in which it will be clear of all the cards. One need simply exert pressure against the lower end portion 242 for this purpose, thus permitting cards to be manually returned to or removed from the capsules as necessary.

Figure 3:
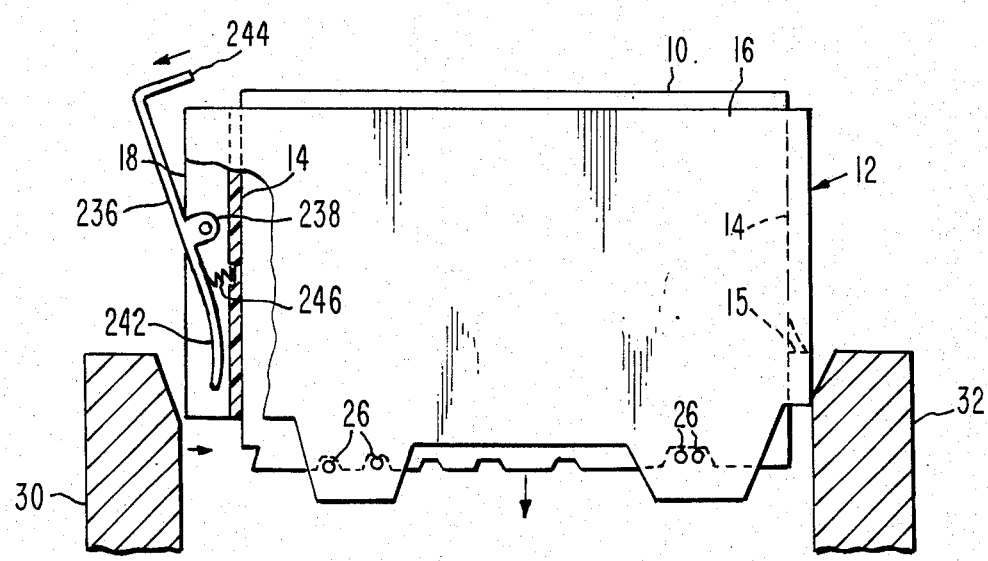
FIG. 3 is a transverse sectional view through the equipment illustrating a capsule being inserted, in which only the capsule-receiving recess is illustrated, a portion of the capsule being broken away.

The card retainer arm 236 is adapted, however, to automatically move to a card-clearing position responsive to insertion of the capsule in the card selection mechanism disclosed in the U.S. Pat. No. 4,421,237. Referring to FIG. 3, when the capsule is being moved downwardly into the space between capsule locating blocks 30, 32 mounted on base 28, block 30 engages the lower extremity of the arm 236, and cams it inwardly as shown in FIG. 3, during the continued downward movement of the capsule to its fully inserted position. Against the restraint of spring 246, this causes lip 244 to move to the left in FIG. 3, to a position in which it clears the cards. It will remain in this position as long as the capsule is within the equipment. Lip 244 automatically returns to its card-protecting position responsive to removal of the capsule from the retrieval device.

Figure 4:
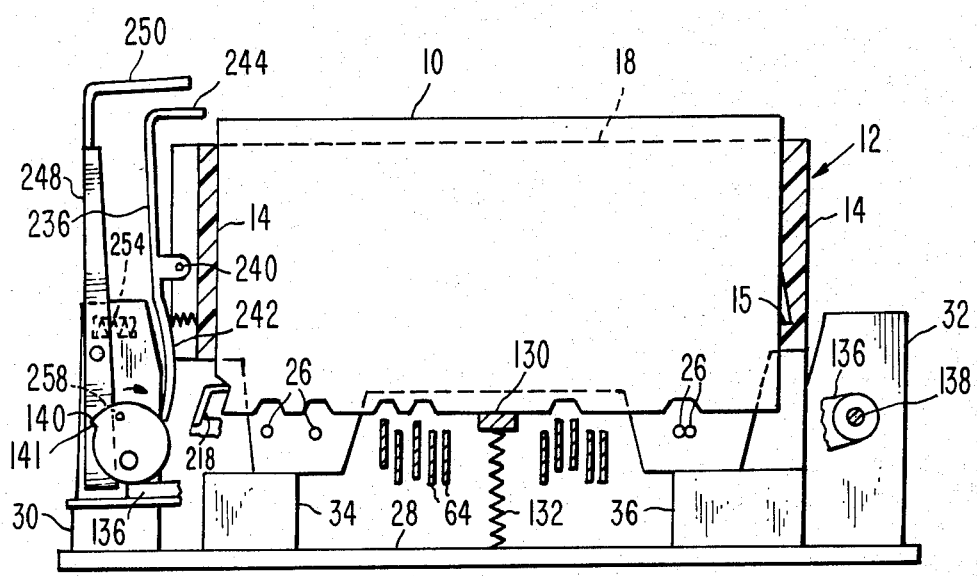
Figure 5:
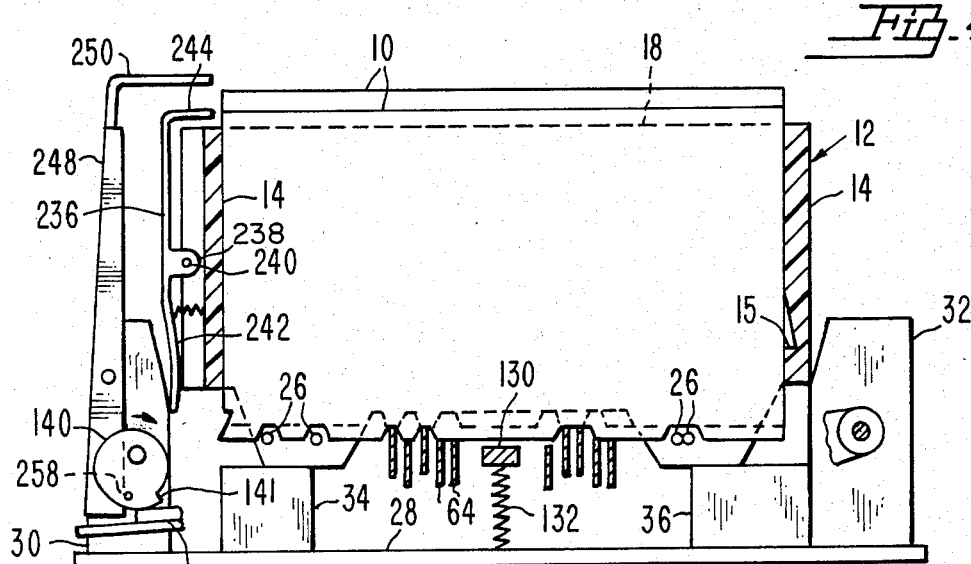
Figure 6:
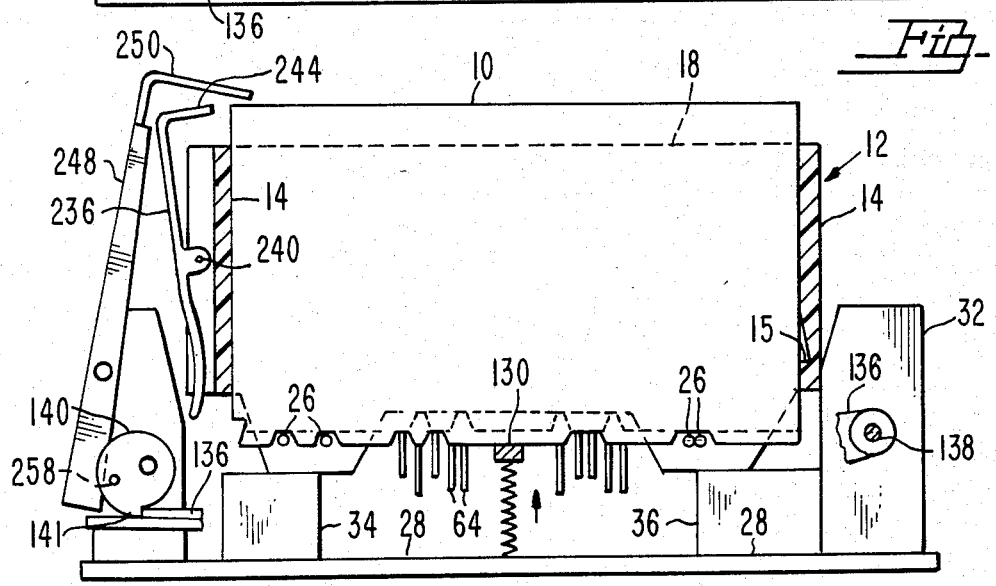

Considering now the improvement of the present application wherein the wanted cards, microfiche, microfiche jackets, or microfilm jackets, are pivotally displaced on ejection to their access positions, it is appropriate to briefly review that part of the selection cycle that is relevant to the present improvement. Thus, FIGS. 4-7 show the capsule, cards, and equipment in successively following stages of the selection and ejection cycle. FIGS. 4-6 indeed, correspond to FIGS. 4-6 of the U.S. Pat. No. 4,421,237.

In FIG. 4 it is seen that the capsule rests upon transversely spaced capsule support blocks 34, 36. Between the blocks there is provided ejector plate 130, urged upwardly by compression coil spring 132. At opposite sides of the ejector plate, there are banks of selector slides 64.

As brought out in the above-mentioned U.S. Pat. No. 4,421,237, when the capsule is moved to its fully inserted position of FIG. 4, all the cards will be elevated by reason of their being supported on ejector plate 130, and also by reason of being engaged by a bail 218. Selected ones of the slides 64 are now raised as shown in FIG. 4.

A cam 140, initially in its FIG. 4 position, begins to slowly rotate, depressing ejector plate control arm 136. Arm 136 is pivotally mounted on support block 32 by pin 138. This lowers the ejector plate 130 to the FIG. 5 position. All the cards are permitted to drop. The wanted cards will have code notches coinciding with those slides 64 that have been elevated. Accordingly, the wanted cards will drop below the unwanted cards as shown in FIG. 5.

At the time the selection cycle began in FIG. 4, a card control arm 248 not disclosed in the U.S. Pat. No. 4,421,237 but comprising part of the present invention, will have been disposed in its normal, retracted, FIG. 4 position. Arm 248 (see FIG. 8) has at its upper end a forwardly projecting flange 250 which, as will presently appear, comprises a fulcrum element.

Arm 248 is normally biased to its retracted, FIG. 4 position by a compression coil spring 254 interposed between the arm 248 and capsule locating block 30 (see FIG. 7), said spring being secured to or held in engagement with the arm 248 by means of a tongue 256 lanced out of the material of the arm, although of course equivalent means can be used for this purpose.

Spring 254 is disposed above a pivot pin 252 pivotally mounting the arm 248 upon block 30.

The cam 140 is disclosed in the U.S. Pat. No. 4,421,237. In accordance with the present invention, however, a cam pin 258 is extended rearwardly therefrom angularly spaced from the step 141 of the cam and leading the step in the sense of the direction of rotation of the cam during a card selection cycle. When the cycle begins, with the arm 248 retracted, the pin 258 is out of contact with the lower end portion of arm 248. This leaves spring 254 free to expand to maintain the fulcrum element in retracted position as shown in FIG. 4.

With the wanted cards, microfiche, microfiche jackets, or microfilm jackets, offset downwardly from the unwanted cards as in FIG. 5, the cam will have rotated to a point where pin 258 engages the lower end of the arm 248. Further rotation of the cam from the FIG. 5 position causes the arm 248 to now be biased clockwise by the pin 258 to the position shown in FIG. 6, in which the fulcrum element 250 now overlies the upper left hand corners of the cards, viewing the same as in FIG. 6. As will be seen from FIG. 5, the engagement of pin 258 with arm 248 to shift the fulcrum element 250 into overlying relation to the cards occurs before step 141 arrives at the extremity of ejector block control arm 136.

When the step 141 becomes coincident with the end of ejector plate control arm 136 (see FIG. 6) the cam pin 258 will have fully positioned fulcrum element 250 over the corners of cards 10. As disclosed in the co-ponding application, when arm 136 drops off the step, ejector plate 130 is now freed to be snapped upwardly under the force of the expanding spring 132. The sudden upward snap motion of the ejector plate is not exerted against any unwanted cards. It is, however, exerted against the wanted card or cards, forcibly biasing the same upwardly so that their corners strike the fulcrum element 250.

Referring to FIG. 7, this causes the wanted cards to pivot about the fulcrum point, after which the wanted cards, as they begin to resettle into the capsule, will engage in the notch 15 at their lower right hand corners, viewing the same as in FIG. 7.

It will be understood that the total length of the cards is less than the length of the capsule, to an extent that will permit the described pivotal movement, which has been exaggerated slightly in FIG. 7 for the purpose of promoting clarity in understanding. In actual practice, with a full-size prototype device and with cards, microfiche, microfiche jackets, or microfilm jackets, of the type that would be actually used in practice, the arrangement in which the cards are pivoted about the fulcrum point and resettle into the notch 15 has been found to work with complete satisfaction.

Figure 1:
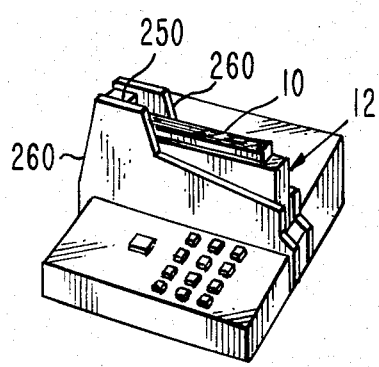
FIG. 1 is a perspective view of the improved information retrieval equipment according to the present invention, with an associated capsule.

For esthetic purposes, and also for protectively enclosing the working parts of the mechanism, the arms 236, 248 can be shielded by walls 260 (FIG. 1) extending transversely across the housing of the machine, and defining a space into which the capsule is to be inserted for a selection cycle.

As the selection cycle comes to a close, the cam 140 reaches the FIG. 4 position once again, at which time the pin 258 disengages fully from the arm 248, allowing the arm to be retracted by spring 254. With the wanted cards now held in elevated, tilted position by notch 15, said cards can be readily removed, and indeed, the entire capsule can now be removed. Removal of the capsule immediately frees the arm 236 for return to its protective position shown in FIG. 2, and it will normally remain in this position (unless manually retracted) until the next occasion on which the capsule is to be inserted in the information retrieval device.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. In a device for retrieving randomly filed cards, microfiche, microfiche jackets or the like, and including a support structure, a capsule removably insertable therein and holding a quantity of randomly filed cards, means for displacing wanted cards relative to unwanted ones preliminary to ejection of the wanted cards, and means for ejecting the wanted cards, the improvement comprising fulcrum means movable between a retracted position, and an advanced position providing in said fulcrum means an element about which a wanted card must pivot when ejected, the capsule having means for engaging the pivoted card against return from its ejected position, the fulcrum means comprising an arm mounted on the support structrue for movement between the retracted and advanced positions thereof, said arm being pivotally mounted on the support structure, the arm being spring-biased to its retracted position, the ejection means including cam means for biasing the arm to its advanced position against the restraint of said spring, the ejection means further including a spring-loaded ejector plate for snapping the wanted cards into engagement with said element of the fulcrum means, said cam means being adapted to first retract the ejection plate against the spring-loading thereof and thereafter release the same to exert its snap-action against the wanted cards.

2. In a device for retrieving randomly filed cards or the like, the improvement of claim 1 wherein the cam means acts upon the arm to advance the same prior to releasing the ejector plate, and holds the arm in advanced position until after the wanted cards have been forced against said element and have been engaged by said means of the capsule.

3. In a device for retrieving randomly filed cards, microfiche, microfiche jackets or the like, and including a support structure, a capsule removably insertable therein and holding a quantity of randomly filed cards, means for displacing wanted cards relative to unwanted ones preliminary to ejection of the wanted cards, and means for ejecting the wanted cards, the improvement comprising fulcrum means movable between a retracted position, and an advanced position providing in said fulcrum means an element about which a wanted card must pivot when ejected, the capsule having means for engaging the pivoted card against return from its ejected position, said capsule further including card retainer means normally overlying portions at least of the cards in the capsule to prevent cards from coming out of the capsule, the card retainer means comprising an arm pivotally mounted on the capsule for movement between a retracted, card-clearing position and an advanced position overlying said portions of the cards, the arm being spring-biased to its advanced position, the arm having an extension engageable by a user to manually retract the arm against the spring bias thereof.

4. In a device for retrieving rendomly filed cards or the like, the improvement of claim 3 wherein said extension is disposed for camming engagement by said support structure responsive to insertion of the capsule into said structure for camming the arm to its retracted position as a response to said insertion.

5. In a device for retrieving randomly filed cards or the like, the improvement of claim 4 wherein the portions of the cards which the arm overlies when in its advanced portions are the portions engaged by said element when the wanted cards are ejected with the fulcrum means in its advanced position.

* * * * *